United States Patent [19]
Oda

[11] 3,909,715
[45] Sept. 30, 1975

[54] COUNTING-RATE METER
[75] Inventor: Minoru Oda, Amagasaki, Japan
[73] Assignee: Mitsubishi Denki Kabushiki Kaisha, Tokyo, Japan
[22] Filed: Oct. 10, 1973
[21] Appl. No.: 405,161

[52] U.S. Cl. .................. 324/78; 328/145; 324/140; 307/229; 329/103
[51] Int. Cl.² ........................................ G01R 23/02
[58] Field of Search ............ 324/132, 78; 328/145; 307/229, 230, 233; 329/102, 103, 107, 204

[56] References Cited
UNITED STATES PATENTS

| | | |
|---|---|---|
| 2,769,098 | 10/1956 | Dunham ........................... 324/140 R |
| 2,877,348 | 3/1959 | Wade et al. ......................... 328/145 |
| 3,048,789 | 8/1962 | Herzog ............................... 329/103 |
| 3,444,362 | 5/1969 | Pearlman ........................... 324/132 |
| 3,609,394 | 9/1971 | Lennox et al. ..................... 328/145 |
| 3,728,636 | 4/1973 | Hill .................................... 307/229 |
| 3,793,480 | 2/1974 | Wachner ............................ 328/145 |

OTHER PUBLICATIONS

Kohonen, "Digital Circuits and Devices," 1972, Catalog Card No. 79-38045, pp. 237, 238.

*Primary Examiner*—Alfred E. Smith
*Assistant Examiner*—Michael J. Tokar
*Attorney, Agent, or Firm*—Wenderoth, Lind & Ponack

[57] ABSTRACT

A direct current signal proportional to a measured counting rate flows through first and second diodes or transistors to be converted to corresponding logarithmic voltages. A constant current from a constant current source flows through the second diode or transistor oppositely to the flow of the dc signal. Both diodes or transistors are interconnected to produce a differential voltage between their converted voltages and the constant current from the source is substantially equal in magnitude to a saturated signal current resulting from a counting loss of measured pulses at their high frequency leading to the automatic correction of the counting loss.

4 Claims, 7 Drawing Figures

COUNTING-RATE METER

BACKGROUND OF THE INVENTION

This invention relates to a counting-rate meter for use in measuring a frequency of incoming electrical pulses.

When a counting-rate meter is used to measure the average frequency $n$ of the occurrence of electrical pulses statistically developed at random, the measured counting rate $n'$ can be expressed by the equation $$n' = \frac{n}{1+n\tau} \quad (1)$$

where $\tau$ is a dead time of the particular measurement system. A difference between the actual and measured counting rates $n$ and $n'$ respectively is called a counting loss. It has heretofore not been possible to accurately correct that counting loss with a simple device. This has caused the inconvenience in that a range of measurable counting rates is narrow.

SUMMARY OF THE INVENTION

Accordingly, it is an object of the present invention to provide a new and improved counting-rate meter capable of automatically correcting a counting-rate in the case a measurement system involved has a dead time.

The present invention accomplishes this object by the provision of a counting-rate meter comprising, in combination, first means responsive to a measured counting-rate of incoming pulses to generate a DC signal current proportional thereto, a source of constant current, a pair of first and second linear-to-logarithmic conversion elements, third means for connecting the first linear-to-logarithmic conversion element to the first means to cause the signal current from the first means to flow through the first conversion element, fourth means for connecting the second linear-to-logarithmic conversion element to both the first means and the source of constant current to cause a differential current between the signal current from the first means and a constant current from the source to pass the differential current through the second conversion element, the constant current from the source having a magnitude substantially equal to a saturated magnitude of the signal current resulting from a counting loss of the signal current at a high frequency of the measured pulses whereby the differential voltage gives a logarithmic representation of the actual counting rate having the counting loss automatically corrected.

In a preferred embodiment of the invention, the first and second linear-to-logarithmic conversion elements may include semiconductor diodes interconnected back to back and having cathode electrodes connected across one input to and an output of an operational amplifier having the other input connected to ground. The one input to the operational amplifier is connected to one end of the first means having the other end connected to ground.

In another preferred embodiment of the present invention, the first linear-to-logarithmic conversion element may include an NPN transistor having a collector electrode connected to the junction of the first means and one input of an operation amplifier having the other input connected to ground, a base electrode connected to the output of the operational amplifier and an emitter electrode connected to the source of constant current while the second linear-to-logarithmic conversion element may includes an NPN transistor having a collector electrode connected to a positive source terminal, an emitter electrode connected to the source of constant current and a base electrode connected to ground. The first means and the source are connected at the other ends to ground.

In order to indicate a linear counting rate having a counting loss automatically corrected, an NPN transistor may be connected at the base electrode to the output of the operational amplifier, a reference voltage from a source of reference voltage being input to the transistor. The source of reference voltage consists of another source of constant current and an NPN transistor including a collector electrode connected to that source, a base electrode connected to both the same source and the base electrode of that transistor having its collector electrode connected to the positive source terminal whereby that transistor connected to the operational amplifier produces at the collector electrode an output indicating the linear counting rate with its emitter electrode connected to ground.

BRIEF DESCRIPTION OF THE DRAWINGS

Other objects, features and advantages of the present invention will become apparent from the following detailed description taken in conjunction with the accompanying drawings in which.

Throughout the Figures like reference numerals designate the identical or corresponding components.

DESCRIPTION OF THE PREFERRED EMBODIMENTS

Figure 1:
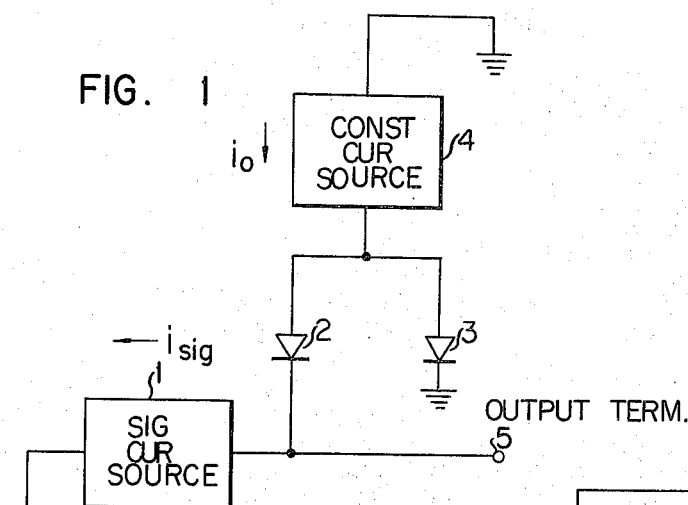
FIG. 1 is a block diagram of the embodiment according to the counting-rate meter of the present invention.

Referring now to the drawings and FIG. 1 in particular, it is seen that an arrangement disclosed herein comprises a source 1 of signal current having one end connected to ground, a first semiconductor diode 2 connected at the cathode electrode to the other or output end of the source 1, second semiconductor diode 3 connected at the anode electrode to the anode electrode of the first diode 2 and at the cathode electrode to ground, and a source 4 of constant current connected at one end to ground and at the other end to the anode electrodes of both diodes 2 and 3. The output of the source 1 is also connected to an output terminal 5.

The source 1 of signal current is responsive to a counting rate of electric pulses or ionizing events measured by the associated measurement system (not shown) to produce a direct current whose magnitude is proportional to the measured counting-rate. The diodes 2 and 3 function as a linear-to-logarithmic conversion elements through the utilization of their exponential rectification characteristic. Thus the diodes 2 and 3 are operative to convert the DC signal currents into corresponding logarithmic currents and cooperate with each other to produce a differential voltage between the logarithmically converted output voltages due to their connection. Also the diode 2 has flowing therethrough the DC signal current from the source 1 while the diode 3 has flowing therethrough a differential current between the signal current from the source 1 and a constant current from the source 4.

If the cathode electrode of the diode 3 is capacitively connected to ground through a capacitor (not shown) but not directly grounded, then the current from the source 1 may be not required to be smoothed.

Assuming the $i_{siu}$ designates the signal current from the source 1 and $i_o$ designates the constant current from the source 4, a potential $Vo$ at the output terminal 5 can be expressed by the following equation:

$$Vo = \frac{kT}{q}\left(ln\frac{i_{siu}-i_{s2}}{i_{s2}} - ln\frac{i_o - i_{siu} - i_{s3}}{i_{s3}}\right)$$

$$= \frac{kT}{q}\left(ln\frac{i_{siu}-i_{s2}}{i_o-i_{siu}-i_{s3}} - ln\frac{i_{s2}}{i_{s3}}\right)$$

$$= \frac{kT}{q}\left(ln\frac{i_{siu}}{i_o-i_{siu}} - ln\frac{i_{s2}}{i_{s3}}\right) \quad (2)$$

where
$k$ = Boltzmann's constant
$T$ = absolute temperature of diode
$q$ = charge of electron
$i_{s2}$ = reverse saturation current for diode 2
$i_{s3}$ = reverse saturation current for diode 3
$i_o$ = saturated magnitude of $i_{siu}$ for counting rate $n$ infinitely great.

The term $i_o$ can be expressed by $$i_o = i_{siu}\tau n' \quad (3)$$

where $\tau$ represents dead time of the particular measurement system and $n'$ represents a counting rate measured by the measuring system.

Substituting the equation (3) for the equation (2) yields $$Vo = \frac{kT}{q}\left(ln\tau\frac{n'}{1-n'\tau} - ln\frac{i_{s2}}{i_{s3}}\right) \quad (4)$$

Substituting the equation (1) for the equation (4) gives $$Vo = \frac{kT}{q}\left(ln\, n\tau - ln\frac{i_{s2}}{i_{s3}}\right) \quad (5)$$

From the equation (5) it can be seen that an input current proportional to a measured counting-rate $n'$ with a counting loss provides an output voltage proportional to a logarithm of a true counting-rate $n$. That is, the counting loss is automatically corrected.

While the output expressed by the equation (5) is logarithmic, a corresponding linear output can be obtained by using a suitable element for converting a logarithmic number into a corresponding linear number whenever it is required to do so. Also, when temperature compensation is required, an element having a gain inversely proportional to an absolute temperature of the associated diode may be additionally used as will be described hereinafter.

Figure 2:
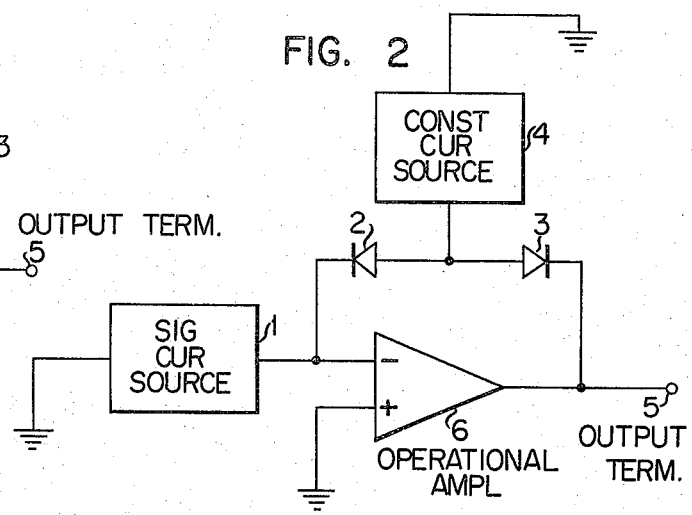
FIG. 2 is a block diagram of a modification of the present invention.

An arrangement as shown in FIG. 2 is different from that illustrated in FIG. 1 only in that in FIG. 2, an operational amplifier 6 is connected between the source 1 and the output terminal 5 while the diodes 2 and 3 interconnected as shown in FIG. 1 forms a feedback circuit for the operational amplifier 6. The operational amplifier 6 includes a negative input connected to the source 1 and a positive input connected to ground. The arrangement is effective for preventing the output voltage from being affected by the associated load.

Figure 3A:
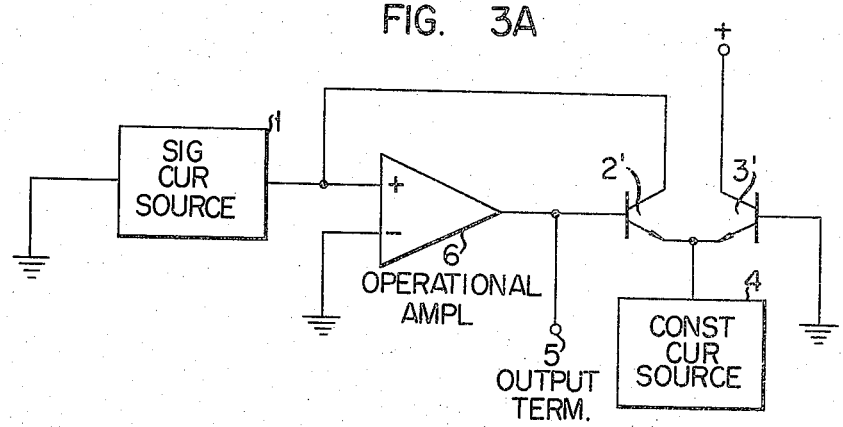
FIG. 3A is a block diagram of another modifications of the present invention.

FIG. 3A is substantially similar to FIG. 2 except for the substitution of transistors for the diodes 2 and 3 shown in FIG. 2. More specifically, the operational amplifier 6 includes a negative feedback circuit composed of a base-to-collector circuit of a first NPN transistor 2' having an emitter electrode connected to the source 4 of constant current. A second NPN transistor 3' includes an emitter electrode connected to both the source 4 of constant current and the emitter electrode of the first transistor 2'. The transistor 3' has its collector electrode connected to a positive source terminal and its base electrode connected to ground.

The arrangement of FIG. 3A is operative following the equations (2) through (5) but it is to be noted that the constant current provided by the source 4 is increased by base currents of the transistors 2' and 3'. The arrangement may be often preferable because the voltage-to-current characteristic of transistors is generally broader in its logarithmic region and there is little variance from one to another transistor as compared with semiconductor diodes.

Figure 3B:
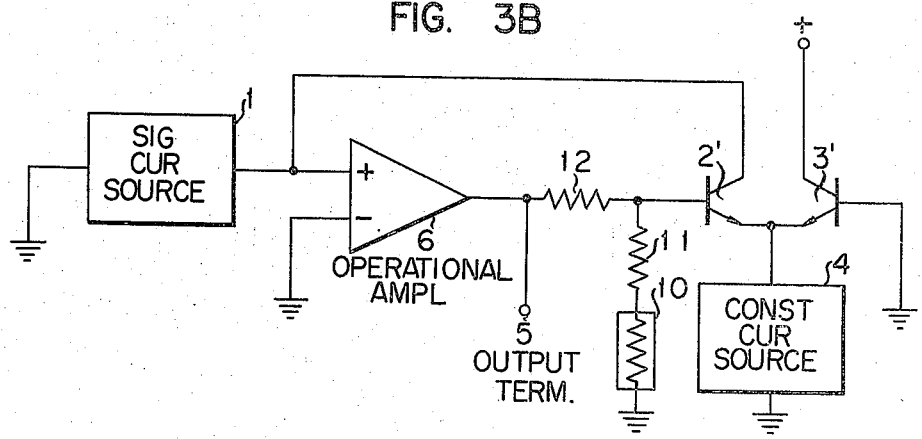
FIGS. 3B and 3C are block diagrams of different modifications of the present invention wherein the temperature compensation is accomplished.
Figure 3C:
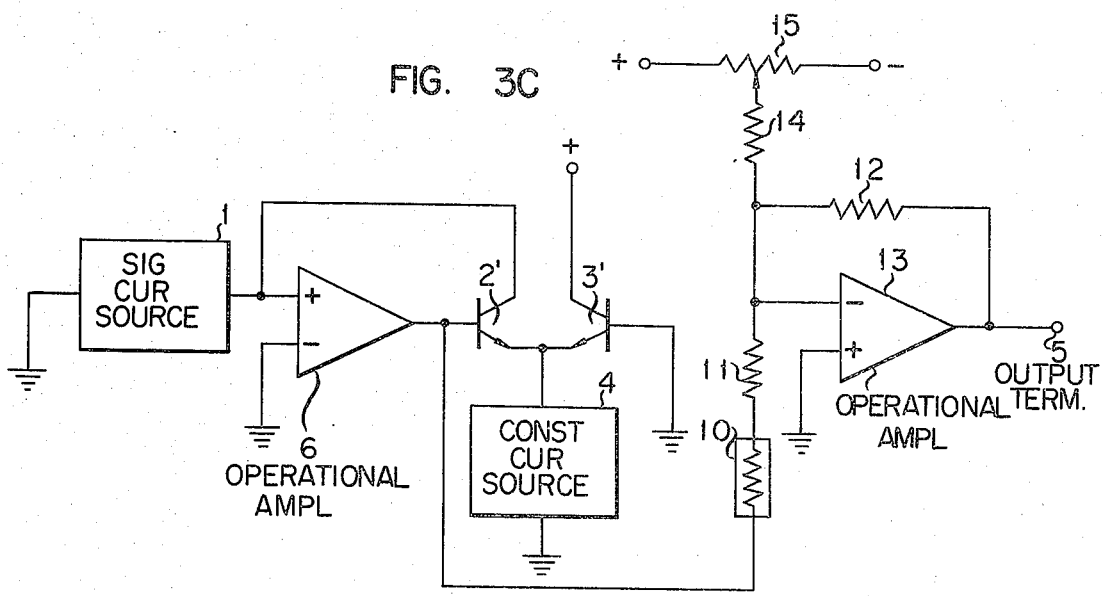

If it is desired to compensate the arrangement of FIG. 3A for temperature, the same can be modified as shown in FIG. 3B or 3C. In FIG. 3B, the transistor 2' has its base electrode connected to ground through serially connected resistors 10 and 11 and also to the output of the operational amplifier 6 and the output terminal 5 through a resistor 12. The resistor 10 is formed of copper, platinum, nickel or the like to have a thermal coefficient of resistance while the resistors 11 and 12 have a very small thermal coefficient of resistance and preferably are formed of any suitable metallic coating. The resistances of the resistors 10, 11 and 12 are selected in such a manner that a divided output voltage from the operational amplifier 6 at the junction of the resistors 11 and 12 is proportional to an absolute temperature. In other respects, the arrangement is identical to that shown in FIG. 3A.

In FIG. 3C, wherein like reference numerals designate the components identical to those shown in FIGS. 3A and 3B, the series combination of resistors 10 and 11 is connected in series circuit relationship with a negative input of an operational amplifier 13 with a feedback resistor 12 between the output of the operational amplifier 6 and the output terminal 5. The operational amplifier 13 has its other input connected to ground. The resistor 11 is also connected by a resistor 14 to an adjustable tap on a potentiometer 15 connected across a suitable source of direct current. The sum of resistances of the resistors 10 and 11 is selected to be proportional to an absolute temperature. In other respects the arrangement is identical to that shown in FIG. 3A.

The resistor 10 cooperates with the transistor 2' in the arrangement of FIG. 3B or with the operational amplifier 13 in the arrangement of FIG. 3C to perform the operation of temperature compensation. The arrangements as shown in FIGS. 3B and 3C provide a high degree of temperature compensation because the transistors 2' and 3' can be disposed in a common casing or formed on a common wafer of semiconductive material to be maintained in good temperature equilibrium. It has been found that arrangements such as shown in FIGS. 3B and 3C carefully produced have temperature stability on the order of 0.0001 dec./°C. This is also true in the case of an arrangement of FIG. 4 as will be subsequently described.

Figure 4:
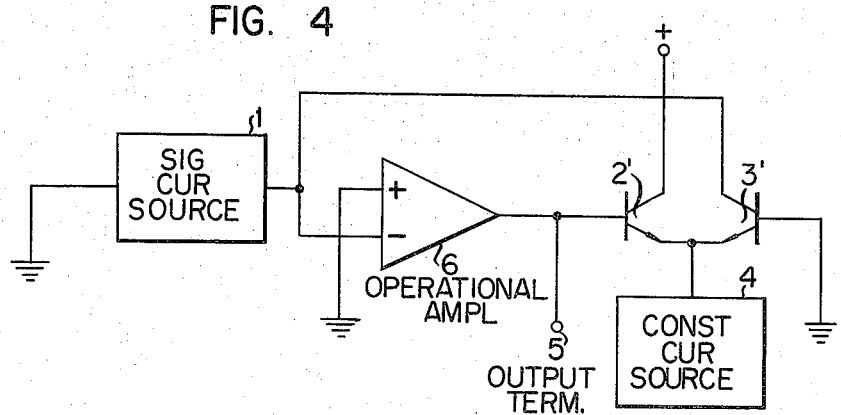
FIG. 4 is a block diagram of still another modification of the present invention.

In FIG. 4 the operational amplifier 6 has its negative input connected to the collector electrode of the transistor 3', rather than of the transistor 2', and also to the source 1 and its positive input connected to ground. Then the collector electrode of transistor 2' is connected to the positive terminal. In other respects, the arrangement is identical to that shown in FIG. 3. Thus it is identical in operation to the arrangement shown in FIG. 3 except for the reversal of the polarity of the output voltage developed at the output terminal 5.

Figure 5:
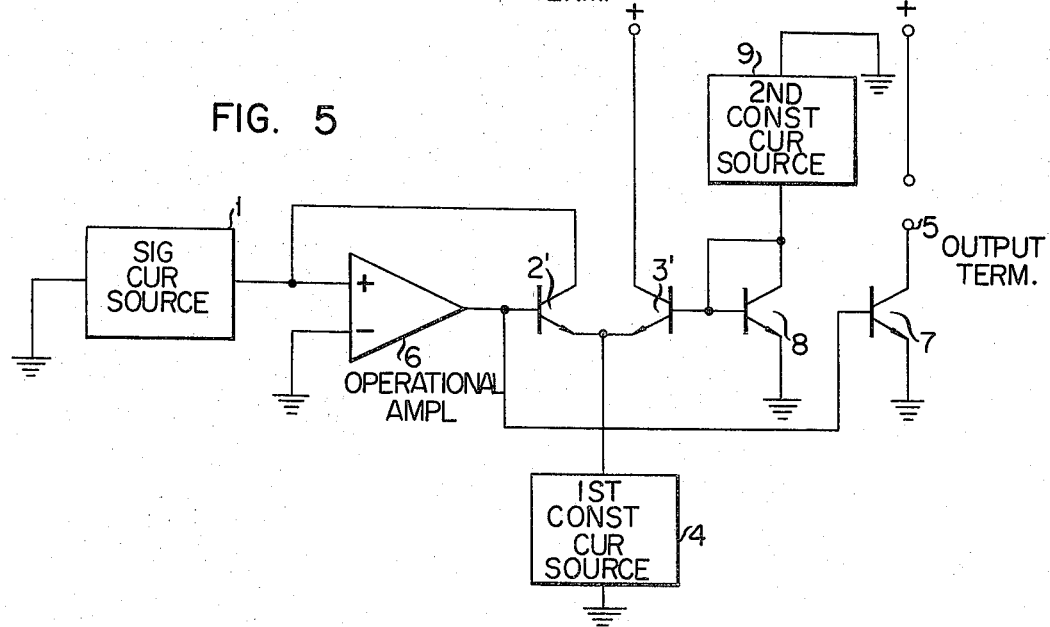
FIG. 5 is a block diagram of a linear counting-rate meter embodying the principles of the invention.

In the arrangements shown in FIGS. 1 through 4, the output voltage at the output terminal 5 is a logarithm of a counting-rate from the source 1 having a counting loss automatically corrected. If it is desired to provide at the output terminal 5 an output voltage linearly proportional to the signal current from the source 1, then an arrangement as shown in FIG. 5 can be effectively used. FIG. 5 shows the arrangement of FIG. 3 and a pair of transistors connected thereto. More specifically, the operational amplifier 6 is connected to the output terminal 5 through an NPN transistor 7. That is, the transistor 7 includes a base electrode connected to the output of the operational amplifier 6, a collector electrode connected to one of the output terminals 5 and an emitter electrode connected to ground to form a common emitter configuration. The other output terminal is connected to a positive source terminal. The transistor 3' has its base electrode connected to a base and a collector electrode of an NPN transistor 8 serving, in this case, to perform the operation of temperature compensation and gain control. The transistor 8 includes an emitter electrode connected to ground and a collector and a base electrode connected to a second source 9 of constant current to form a source of reference voltage. A reference voltage from the source 9 is adapted to be imparted to the transistor 8 acting as a logarithmic-to-linear conversion element as will be subsequently described.

Assuming that $V_2$, $V_3$, $V_7$ and $V_8$ represent voltages across the base and collector electrodes of the transistors 2', 3', 7 and 8 respectively, the following equation obtains:

$$V_2 - V_3 = V_7 - V_8 \quad (6)$$

On the other hand, the differential voltage $(V_7 - V_8)$ can be expressed by the equation $$V_7 - V_8 = \frac{kT}{q}\left(\ln \frac{i_5}{i_{s7}} - \ln \frac{i_9}{i_{s8}}\right) \quad (7)$$

where
$i_{s7}$ = saturated emitter current for transistor 7
$i_{s8}$ = saturated emitter current for transistor 8
$i_9$ = constant current supplied by the source 9
$i_5$ = current flowing through output terminals 5.

It is recalled that the constants $k$, $T$ and $q$ have already been defined in conjunction with the equation (2).

Since the differential voltage $(V_2 - V_3)$ is equal to the voltage Vo on the lefthand side of the equation (5), equalling the lefthand side of the equation (6) to the righthand side of the equation (5) yields $$\ln nT + \ln \frac{i_{s2}}{i_{s3}} = \ln \frac{i_5}{i_{s7}} - \ln \frac{i_9}{i_{s8}}$$

Therefore $$i_5 = nT\, i_9\, \frac{i_{s2}\, i_{s8}}{i_{s3}\, i_{s7}} \quad (8)$$

From the equation (8) it can be seen that the output current $i_5$ is proportional to the true counting-rate $n$. The current $i_9$ can be utilized to adjust the system gain because its magnitude can be selected at will. Further the arrangement of FIG. 5 is compensated for the temperature because the transistor 8 has the function of temperature compensation.

From the foregoing it will be appreciated that the present invention provides a simple device for automatically correcting any counting loss due to dead time, which has been previously difficult. Also a range of measurable counting-rates can be expanded with the same counting-rate meter or measurement system as the conventional one. Although the expansion of the measurable range depends upon the particular requirements, the measurable range may be expanded to ten times as compared with the prior art practice with a required accuracy of 10% and the measurement system having a stability of 10% of its dead time.

While the present invention has been illustrated and described in conjunction with a several preferred embodiments thereof it is to be understood that numerous changes and modifications may be resorted to without departing from the spirit and scope of the invention. For example, the operational amplifier may be operatively coupled to means for stabilizing the negative feedback at higher frequencies. Also in order to maintain the statistical fluctuations of the output voltage constant without relying upon the input level, the diode 3 or transistor 3' may have a high capacitance capacitor connected thereacross while the diode 2 or transistor 2' may have connected thereacross a capacitor having a suitable capacitance. Also instead of NPN transistors, PNP transistors may be equally used with the polarity of the sources reversed from that illustrated.

What is claimed is:

1. A counting-rate meter comprising, in combination, signal current generator means having two ends and connected at one end to ground to respond to a measured counting-rate of pulses to generate a signal current proportional thereto, an operational amplifier connected at one input to the other end of said signal current means, the other input connected to ground and an output, a pair of first and second sources of constant current having two ends each and connected at one end to ground, a first NPN transistor including a collector electrode connected to the other end of said signal current generator means, an emitter electrode connected to said first source of constant current at the other end, and a base electrode connected to said output of said operational amplifier, a second NPN transistor including a collector electrode connected to a positive source terminal, an emitter electrode connected to the emitter electrode of said first transistor and a base electrode connected to said second source of constant current at the other end, a third NPN transistor including a collector electrode connected to the other end of said second source of constant current, an emitter electrode connected to ground and a base electrode connected to the base electrode of said second transistor, an output terminal, a fourth NPN transistor including a collector electrode connected to said output terminal, an emitter electrode connected to ground and a base electrode connected to said output of said operational amplifier, a constant current from said first source having a magnitude preset to a saturation magnitude of a current resulting from a counting loss of the signal input current at a high frequency of measured pulse thereby to automatically correct the counting loss while said second source of constant current provides a reference voltage for said fourth transistor thereby to produce a linear output at said output terminal.

2. A counting-rate meter comprising, in combination:
a first means connected at one end to ground and responsive to a measured counting rate of incoming pulses to generate a signal current proportional thereto;
a source of constant current connected at one end to ground;
a pair of first and second linear-to-logarithmic conversion elements, said first linear-to-logarithmic conversion element being operatively coupled to said first means to cause said signal current from said first means to flow through said first conversion element, said second linear-to-logarithmic conversion element being operatively coupled to both said source of constant current and said first means to produce a differential current between a constant current from said source and said signal current from said first means to pass said differential current through said second conversion element, said first and second linear-to-logarithmic conversion elements being interconnected to produce an output voltage formed of a differential voltage between respective converted output voltages from said first and second linear-to-logarithmic conversion elements, said constant current from said source having a magnitude substantially restricted to a saturated magnitude of said signal current resulting from a counting loss of the signal current at a high frequency of measured pulses, whereby said differential voltage gives a logarithmic representation of the measured counting-rate having the counting loss automatically corrected; and
an operational amplifier having one input connected to the other end of said first means, the other input connected to ground, and an output, and an output terminal connected to said output of said operational amplifier, said first linear-to-logarithmic conversion element including a first semiconductor diode having a cathode electrode connected to the other end of said first means and an anode electrode connected to said source of constant current at the other end and said second linear-to-logarithmic conversion element including a second semiconductor diode having a cathode electrode connected to said output of said operational amplifier and an anode electrode connected to both the other end of said source of constant current and said anode electrode of the first semiconductor diode.

3. A counting-rate meter comprising, in combination:
a first means connected at one end to ground and responsive to a measured counting rate of incoming pulses to generate a signal current proportional thereto;
a source of constant current connected at one end to ground;
a pair of first and second linear-to-logarithmic conversion elements, said first linear-to-logarithmic conversion element being operatively coupled to said first means to cause said signal current from said first means to flow through said first conversion element, said second linear-to-logarithmic conversion element being operatively coupled to both said source of constant current and said first means to produce a differential current between a constant current from said source and said signal current from said first means to pass said differential current through said second conversion element, said first and second linear-to-logarithmic conversion elements being interconnected to produce an output voltage formed of a differential voltage between respective converted output voltages from said first and second linear-to-logarithmic conversion elements, said constant current from said source having a magnitude substantially restricted to a saturated magnitude of said signal current resulting from a counting loss of the signal current at a high frequency of measured pulses, whereby said differential voltage gives a logarithmic representation of the measured counting-rate having the counting loss automatically corrected; and
an operational amplifier having one input connected to said first means at the other end, the other input connected to ground and an output, and an output terminal connected to the output of said operational amplifier, and said first linear-to-logarithmic conversion element including a first transistor having a collector electrode connected to the other end of said first means, an emitter electrode connected to the other end of said source and a base electrode connected to the output of said operational amplifier while said second linear-to-logarithmic conversion element includes a second transistor having a collector electrode connected to a positive source terminal, an emitter electrode connected to said emitter electrode of said first transistor and a base electrode connected to ground.

4. A counting-rate meter comprising, in combination:
a first means connected at one end to ground and responsive to a measured counting rate of incoming pulses to generate a signal current proportional thereto;
a source of constant current connected at one end to ground;
a pair of first and second linear-to-logarithmic conversion elements, said first linear-to-logarithmic conversion element being operatively coupled to said first means to cause said signal current from said first means to flow through said first conversion element, said second linear-to-logarithmic conversion element being operatively coupled to both said source of constant current and said first means to produce a differential current between a constant current from said source and said signal current from said first means to pass said differential current through said second conversion element, said first and second linear-to-logarithmic conversion elements being interconnected to produce an output voltage formed of a differential voltage between respective converted output voltages from said first and second linear-to-logarithmic conversion elements, said constant current from said source having a magnitude substantially restricted to a saturated magnitude of said signal current resulting from a counting loss of the signal current at a high frequency of measured pulses, whereby said differential voltage gives a logarithmic representation of the measured counting-rate having the counting loss automatically corrected; and an operational amplifier having one input connected to said first means at the other end, the other input connected to ground and an output, an output terminal connected to said output of said operational amplifier, and said first linear-to-logarithmic conversion element including a first NPN transistor having a collector electrode connected to a positive source terminal, an emitter electrode connected to the other end of said first means and a base electrode connected to said output of said operational amplifier while said second linear-to-logarithmic conversion element includes a second NPN transistor having a collector electrode connected to the other end of said first means, an emitter electrode connected to said emitter electrode of the first transistor and a base electrode connected to ground.

\* \* \* \* \*